US012572639B2

(12) United States Patent
Lev et al.

(10) Patent No.: US 12,572,639 B2
(45) Date of Patent: Mar. 10, 2026

(54) GENERATIVE ARTIFICIAL INTELLIGENCE FOR VALIDATION OF A HUMAN USER

(71) Applicant: NEC Corporation Of America, Herzlia (IL)

(72) Inventors: Tsvi Lev, Tel-Aviv (IL); Yaacov Hoch, Ramat-Gan (IL)

(73) Assignee: NEC Corporation Of America, Herzlia (IL)

( * ) Notice: Subject to any disclaimer, the term of this patent is extended or adjusted under 35 U.S.C. 154(b) by 66 days.

(21) Appl. No.: 18/635,080

(22) Filed: Apr. 15, 2024

(65) Prior Publication Data

US 2025/0322055 A1     Oct. 16, 2025

(51) Int. Cl.
*G06F 21/36*          (2013.01)

(52) U.S. Cl.
CPC ...... *G06F 21/36* (2013.01); *G06F 2221/2133* (2013.01)

(58) Field of Classification Search
CPC ......................... G06F 21/36; G06F 2221/2133
See application file for complete search history.

(56) References Cited

U.S. PATENT DOCUMENTS

2024/0320310 A1 *   9/2024   Callegari ................ H04L 63/10
2024/0329945 A1 *   10/2024  Asadullah .......... G06Q 30/0201

* cited by examiner

*Primary Examiner* — Hany S. Gadalla

(57)          ABSTRACT

There is provided a computer implemented method of validation of a human user, comprising: feeding a description of a first object into a GenAI model to generate at least one image depicting a plurality of instances of the first object and a plurality of second objects different than the first object, each instance representing a unique variation of the first object, via a user interface presented on a display of a client terminal: presenting the at least one image, presenting instructions for a user to identify common instances of objects having unique variations that are depicted in the at least one image, receiving the user indication, and validating that the user is a human when the common instances of objects identified by the user matches the description of the first object fed into the GenAI model.

22 Claims, 4 Drawing Sheets

100

GENERATIVE ARTIFICIAL INTELLIGENCE FOR VALIDATION OF A HUMAN USER

FIELD AND BACKGROUND OF THE INVENTION

The present invention, in some embodiments thereof, relates to validation of a human user and, more specifically, but not exclusively, to systems and methods for generating images for validation of a human user.

Validating that a user is human rather than a computer is a crucial aspect of many online systems and services. This validation process is commonly referred to as "CAPTCHA" (Completely Automated Public Turing test to tell Computers and Humans Apart).

SUMMARY OF THE INVENTION

According to a first aspect, a computer implemented method of validation of a human user, comprises: feeding a description of a first object into a GenAI model to generate at least one image depicting a plurality of instances of the first object and a plurality of second objects different than the first object, each instance representing a unique variation of the first object, via a user interface presented on a display of a client terminal: presenting the at least one image, presenting instructions for a user to identify common instances of objects having unique variations that are depicted in the at least one image, receiving the user indication, and validating that the user is a human when common instances of objects identified by the user matches the description of the first object fed into the GenAI model.

In a further implementation form of the first aspect, the description of the first object fed into the GenAI model is non-presented on the display and/or is non-accessible to the user.

In a further implementation form of the first aspect, the GenAI model generates a plurality of first images each including a respective instance of the first object and a plurality of second images each excluding the first object, and the presented instructions are to identified a set of images from the plurality of first images and the plurality of second images that have a common object.

In a further implementation form of the first aspect, the GenAI model generates a plurality of first images each including a respective instance of the first object and a plurality of second images each excluding the first object, and the presented instructions are to identified a set of images from the plurality of first images and the plurality of second images that do not have an object in common.

In a further implementation form of the first aspect, the unique variations are selected from: a unique angle, a unique size, a unique shape, a unique additional structural element, depicted as being made from a unique material, a certain type of the first object located on and/or within another type of the first object, a unique texture, a unique color, and depicted as made from a third object that is visually similar to a type of the first object.

In a further implementation form of the first aspect, the description including the first object is randomly generated for creating a unique image.

In a further implementation form of the first aspect, the description indicates a scenario including the first object that is physically impossible in real life.

In a further implementation form of the first aspect, the description is of a representation of the first object that is different than the first object itself.

In a further implementation form of the first aspect, the description is selected from a group comprising: an embroidery texture of the first object, a comic illustration of the first object, a non-realistic painted version of the first object, and a representation of the first object on a surface of a third object.

In a further implementation form of the first aspect, the description is of a texture of the first object that is different than a real life texture of the first object.

In a further implementation form of the first aspect, the at least one image further depicts a plurality of second objects different than the first object.

In a further implementation form of the first aspect, the at least one image comprises a first image generated using a first random seed, and further comprising: generating a second image by feeding the description into the GenAI using a second random seed, and generating a plurality of third images depicting a plurality of second objects different than the first object using the GenAI model, wherein presenting the image comprises presenting the first image, the second image, and the plurality of third images, wherein the presented instructions are for matching images with a common element, wherein validating comprises validating when the first image and the second image are indicated by the user.

In a further implementation form of the first aspect, further comprising iterating the feeding, the presenting the at least one image, the presenting instructions, and the receiving instructions, for validating that the user is human when a number of iterations in which the common instances of objects identified by the user correctly matches the description, is selected according to a statistical prediction of the GenAI model erroneously generating the at least one image that does not match the description of the first object.

In a further implementation form of the first aspect, the at least one image comprises a plurality of images, and a number of the plurality of images and the instructions for the user for validating that the user is human, are selected according to a statistical prediction of the GenAI model erroneously generating an image of the number of the plurality of images that does not match the description of the first object, wherein the validating that the user is human is performed when a target less than the number of images is selected by the user for compensating for the statistical prediction of the GenAI model erroneously generating the image.

In a further implementation form of the first aspect, at least one of the number of the plurality of images is intentionally created using a different description of the first object.

According to a second aspect, a computer implemented method of validation of a human user, comprises: feeding a description of an object into a generative artificial intelligence (GenAI) model to generate an image with a representation of the object that is different than the object itself, via a user interface presented on a display of a client terminal: presenting the image, presenting instructions for a user to indicate the object, wherein the description of the object fed into the GenAI model is non-presented on the display and/or is non-accessible to the user, receiving the user indication, and validating that the user is a human when the user indication matches the description fed into the GenAI model.

In a further implementation form of the second aspect, the description is selected from a group comprising: an embroidery texture of the object, a comic illustration of the object, a non-realistic painted version of the object, and a representation of the object on a surface of a second object.

In a further implementation form of the second aspect, the description is of a texture of the object that is different than a real life texture of the object.

According to a third aspect, a computer implemented method of validation of a human user, comprises: accessing at least one personal parameter of a user, feeding a text directive including the at least one personal parameter into a generative artificial intelligence (GenAI) model to generate an image visually depicting the at least one personal parameter, via a user interface presented on a display of a client terminal: presenting the image, presenting instructions for a user to indicate at least one of: the image depicting the at least one personal parameter, and the at least one personal parameter depicted in the image, receiving the user indication, and validating that the user is a human when the user indication matches the at least one personal parameter of the text directive fed into the GenAI model.

In a further implementation form of the third aspect, the at least one personal parameter of the user is selected from: a webpage the user recently looked at, a hobby of the user, a picture of a person related to the user, and an object the user possesses.

According to a fourth aspect, a computer implemented method of validation of a human user, comprises: accessing at least one current state of a dynamic process accessible by a user, feeding a text directive including the at least one current state into a generative artificial intelligence (GenAI) model to generate an image visually depicting the at least one current state, via a user interface presented on a display of a client terminal: presenting the image, presenting instructions for a user to indicate at least one of: the image depicting the at least current state, and the at least one current state depicted in the image, receiving the user indication, and validating that the user is a human when the user indication matches the at least one current state of the text directive fed into the GenAI model.

In a further implementation form of the fourth aspect, the at least one current state is selected from: current weather where the user is living, subject currently in the news, current value of a stock market index, current website open in another window on a client terminal of the user.

According to a fifth aspect, a computer implemented method of validation of a human user, comprises: accessing a description of an animation, feeding a text directive including the description of the animation into a generative artificial intelligence (GenAI) model to generate a video depicting the animation over a plurality of frames, via a user interface presented on a display of a client terminal: presenting the video, presenting instructions for a user to indicate at least one of: the video depicting the animation, and the animation depicted in the video, receiving the user indication, and validating that the user is a human when the user indication matches the animation of the text directive fed into the GenAI model.

In a further implementation form of the fifth aspect, the animation is selected from: an emotion, an action, a dance, and an expression.

According to a sixth aspect, a computer implemented method of validation of a human user, comprises: feeding a text directive into a generative artificial intelligence (GenAI) for generating at least one image depicting a plurality of different objects and/or different variations of at least one common object, via a user interface presented on a display of a client terminal: presenting the at least one image, presenting instructions for a user to perform an interactive task with the at least one image, wherein the text directive fed into the GenAI model is non-presented on the display and/or is non-accessible to the user, analyzing interaction of the user performing the interactive task with respect to the text directive, and validating that the user is a human when the interactions of the user performing the interactive task correlate with the text directive.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE DISCLOSURE

Figure 1:
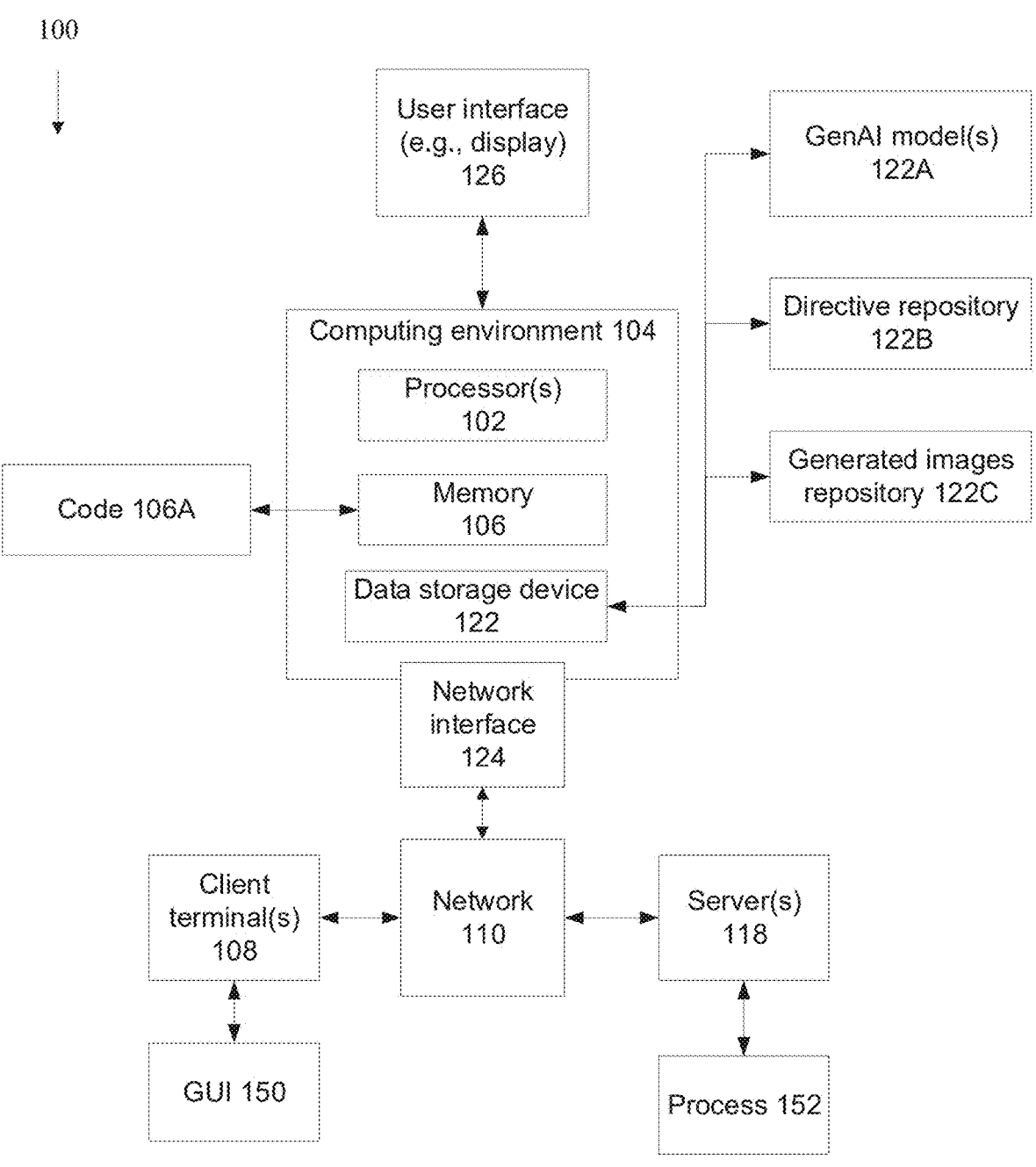
FIG. 1 is a block diagram of components of a system for validating that a user is human based on analyzing interactions of a user with one or more images created by a generative artificial intelligence (GenAI) model without presenting a text directive fed into the GenAI model used to create the image(s), in accordance with some embodiments of the present invention.

The present invention, in some embodiments thereof, relates to validation of a human user and, more specifically, but not exclusively, to systems and methods for generating images for validation of a human user.

An aspect of some embodiments of the present invention relates to systems, methods, computing devices, and/or code instructions (stored on a data storage device and executable by one or more processors) for validation that a user is human by analyzing interactions of the user with one or more images created by a generative artificial intelligence (GenAI) model without presenting instructions, optionally a text directive, fed into the GenAI model used to create the image(s). The instructions, optionally the text directive, are fed into the GenAI model for generating one or more images depicting multiple different objects and/or different variations of a common object, for example, one or more of: different angles, different sizes, different shape, different additional structural elements, depicted as being made from a material that is different than the material the object is unique made from, a texture that is different than a standard texture of the object, different colors, and depicted as made from another object that is visually similar to a type of the object depicted in the image. Additional examples of text directives and/or generated images are described herein. The generated image(s) may be complex, depicting the objects for example, in multiple views, of multiple textures, of different sizes, shapes, colors, and the like. The generated image(s) may be presented within a user interface, optionally a graphical user interface (GUI) presented on a display of a client terminal. The user of the client terminal may be the user being validated. Instructions for a user (i.e., human user) to perform an interactive task with the image(s) may be presented within the user interface. Exemplary interactive tasks are described herein. The text directive of the object fed into the GenAI model is non-presented on the display and/or is non-accessible to the user. The generated image(s) may be designed to be too complex for a processor executing code to automatically analyze to correctly perform the interactive task, in particular when the processor is not provided with the text directive. However, the generated images may be designed for a typical human to analyze fairly quickly to successfully perform the interactive task, even when the human user is not provided with the text directive. The interactive task performed by the user is analyzed with respect to the text directive, to determine whether the user correctly performed the interactive task or not. Examples of the user correctly performing the interactive task are described herein. The user is validated as human when the interactive task correlates with the text directive.

At least one embodiment described herein addresses the technical problem of validating that a user is human. At least one embodiment described herein improve upon the technology of tools for validating that a user is human. At least one embodiment described herein improves upon prior approaches for validating that a user is human.

Validating that a user is human may be performed, for example, to prevent automated systems, such as bots and/or crawlers, from accessing and/or interacting with certain online services and/or platforms. Examples of why validation that a user is human is used:

Preventing Spam: Bots can be programmed to spam websites, forums, or comment sections with irrelevant or malicious content, which can degrade the user experience and reduce the quality of the platform.

Protecting Security: Bots can be used to carry out automated attacks such as credential stuffing, where large sets of usernames and passwords are automatically tested against login forms to gain unauthorized access to user accounts.

Preserving Fairness: In contexts where limited resources or services are available (e.g., concert ticket sales, online polls), bots can be used to unfairly manipulate outcomes by overwhelming systems with automated requests, depriving genuine users of access.

Ensuring Accuracy: Some online activities, such as surveys or quizzes, are designed for human participants.

Validating that a user is human helps ensure the accuracy and reliability of the data collected.

Various methods of human validation, known as CAPTCHA (Completely Automated Public Turing test to tell Computers and Humans Apart), have been developed. These methods typically involve presenting users with challenges that are easy for humans to solve but difficult for automated systems, such as identifying distorted text (e.g., alphanumerical code the user is able to read by hard for a computer to decipher), selecting specific objects in images, asking the user to mark/select all images containing some common object, or solving simple puzzles.

In parallel to the attempt at developing improved approaches for validating that a user is human, improved automated processes for overcoming the validation process are being developed. For example, improved optical character recognition (OCR) processes may crack modern alpha numeric captchas. In another example, since datasets (e.g., publicly available) are not infinite, modern object detector models trained on such datasets may be able to detect objects like a human.

At least one embodiment described herein address the aforementioned technical problem, and/or improves the aforementioned technical field, and/or improves upon the aforementioned prior approaches, by using a GenAI model to create complex images based on directives, for example, including multiple different objects and/or multiple different instances of a same type of object, using various styles in the image. The images may include many objects, which may be in unique angles and/or may depict features which rarely or never happen in reality. The GenAI model may create the complex image from text which may be randomly generated by a computer. Unique images each with a different combination of objects and/or features may be generated by the GenAI model. The images may be dynamically generated without repetition. Humans are able to 'decode' much of the directive based on the image itself (e.g., 'there is a purple cow here flying over a green pasture'), even without knowing the textual directive fed into the GenAI model used to create the image. For example, a human is able to match two images out of multiple complex images that depict different unique variations of a same type of object, where the complex images are generated by feeding a text description of the object into the GenAI model, without being told what the common object (or common element and/or common feature) is. In contrast, it is technically challenging for automated object detector processes and/or other AI image analysis engines to reliably detect all or most objects in an image depicting a complex environment. In particular, the automated processes are much less accurate when the objects in the complex image have unusual textures, presented in unusual angles, are in a non photo-realistic style, and/or depict scenarios that are not possible in real time. Moreover, the automated object detection processes are technically challenged in correctly detecting a first object located on and/or within a second object. For example, for an image depicting a picture of a car located on a t-shirt worn by a driver sitting inside a car, the automated object detection processes cannot reliably detect the three depicted objects (i.e., real car, t-shirt, picture of car on t-shirt) which are simultaneously depicted in the same image due to their arrangement one within/on the other. In contrast, a human is easily able to distinguish between the picture of the car on the t-shirt, the t-shirt itself, and the "real" car.

By not presenting and/or not otherwise indicating the text directive fed into the GenAI model, overcoming the validation process by an automated AI based cheater becomes technically difficult. For example, the user is instructed to select the images that exclude a common target object, and/or select images that include the target object, without specifying what the target object actually is. This is in contrast to other approaches that specify what the target object is, for example "Select all images with stoplights". An AI based cheater may use the instructions as a clue to find the images with stoplights. Humans are much better at deciding which objects they see in a complex background, without being told what to look for. Without being told what to search for, the AI based cheater will not be able to successfully complete the task, or at best may take a very long time to complete the task since a very large amount of processing is required to search for the unknown.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
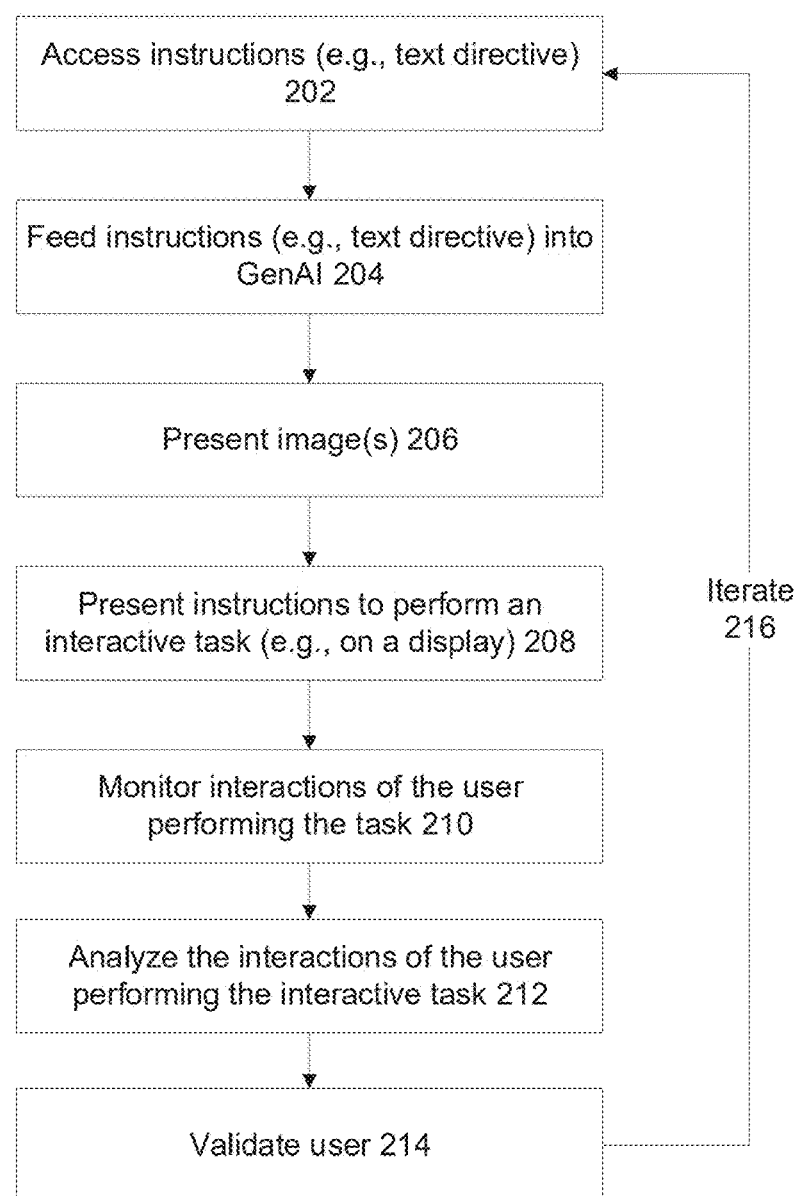
FIG. 2 is a flowchart of a method of validating that a user is human based on analyzing interactions of a user with one or more images created by a GenAI model without presenting a text directive fed into the GenAI model used to create the image(s), in accordance with some embodiments of the present invention.
Figure 3:
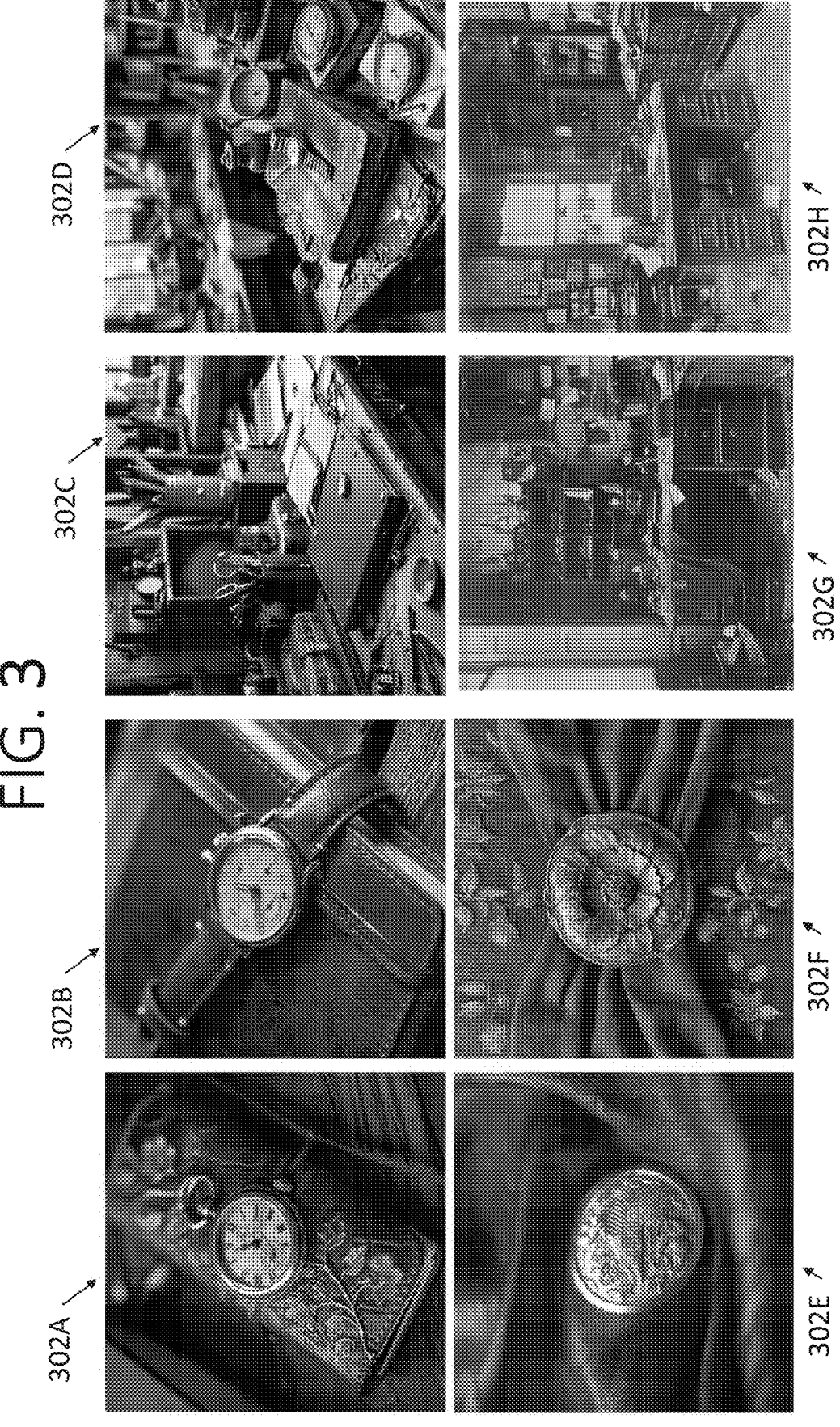
FIG. 3 is a schematic of images created by a GenAI model without presenting a text directive fed into the GenAI model used to create the image(s) for validating that a user is human, in accordance with some embodiments of the present invention.
Figure 4:
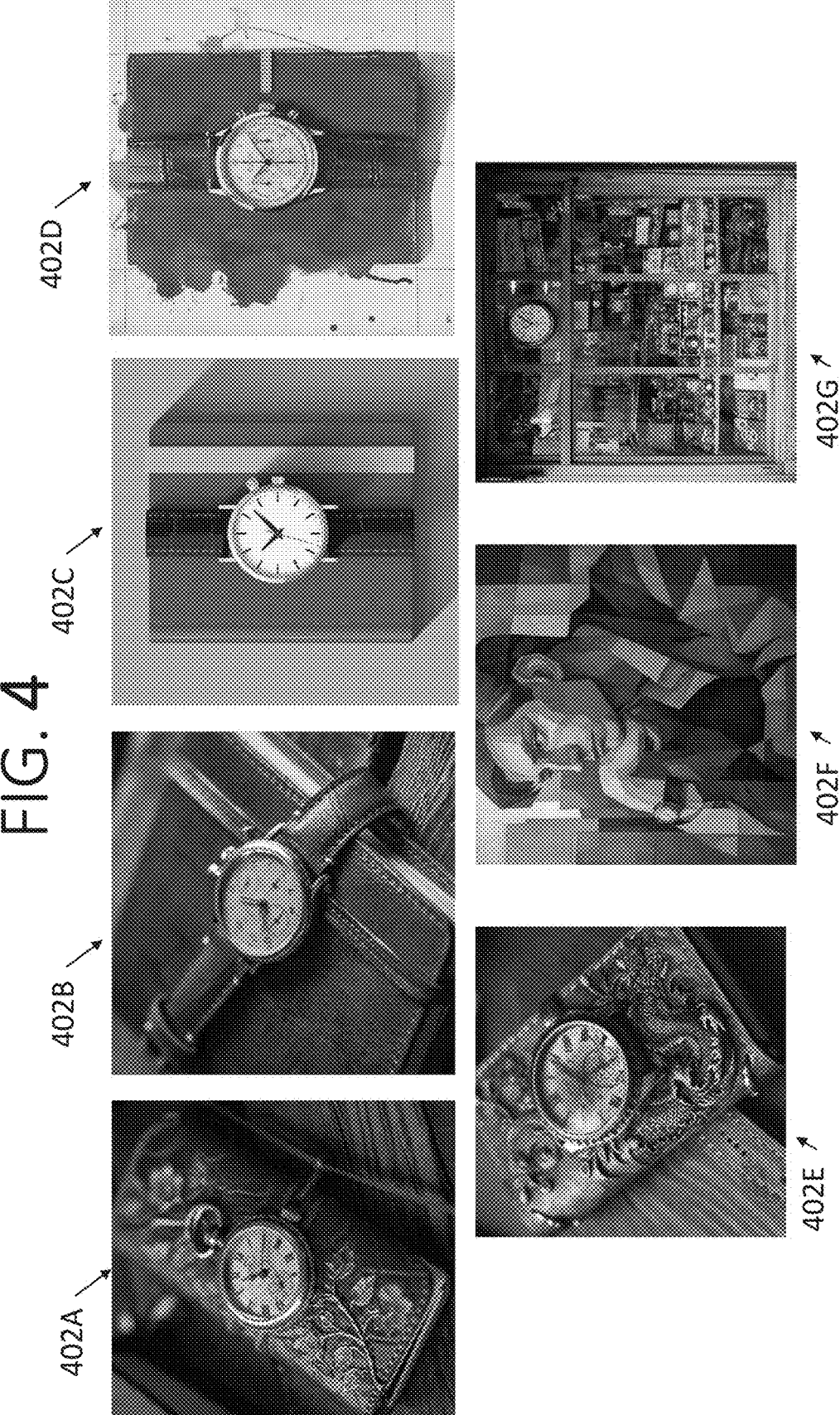
FIG. 4 is another schematic of images created by a GenAI model without presenting a text directive fed into the GenAI model used to create the image(s) for validating that a user is human, in accordance with some embodiments of the present invention.

Reference is now made to FIG. 1, which is a block diagram of components of a system 100 for validating that a user is human based on analyzing interactions of a user with one or more images created by a GenAI model without presenting a text directive fed into the GenAI model used to create the image(s), in accordance with some embodiments of the present invention. Reference is also made to FIG. 2, which is a flowchart of a method of validating that a user is human based on analyzing interactions of a user with one or more images created by a GenAI model without presenting a text directive fed into the GenAI model used to create the image(s), in accordance with some embodiments of the present invention. Reference is also made to FIG. 3, which is a schematic of images created by a GenAI model without presenting a text directive fed into the GenAI model used to create the image(s) for validating that a user is human, in accordance with some embodiments of the present invention. Reference is also made to FIG. 4, which is another schematic of images created by a GenAI model without presenting a text directive fed into the GenAI model used to create the image(s) for validating that a user is human, in accordance with some embodiments of the present invention.

System 100 may implement the acts of the method described with reference to FIG. 2, by processor(s) 102 of a computing environment 104 executing code instructions stored in a memory 106 (also referred to as a program store).

Computing environment 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Computing environment 104 feeds a directive (e.g., obtained from directive repository 122B) into a GenAI model(s) 122A for generating one or more images used for validation that a user is human. The generated images and instructions (e.g., for interacting with the generated images) may be presented within a GUI 150, optionally presented on a display of a client terminal 108. The validation process for verification that a user is human may be triggered, for example, in response to client terminal 108 attempting to access a process 152 hosted by a server 118.

Multiple architectures of system 100 based on computing environment 104 may be implemented. For example:

Computing environment 104 executing stored code instructions 106A, may be implemented as one or more servers (e.g., network server, web server, a computing cloud, a virtual server) that provides centralized services for validation that a user is human (e.g., one or more of the acts described with reference to FIG. 2). Services may be provided, for example, to one or more client terminals 108 over network 110, and/or to one or more server(s) 118 over network 110. Server(s) 118 may host one or more processes 152, where an attempt to access process 152, such as by client terminal(s) 108, triggers the process for validating that a user of client terminal 108 is human. Services may be provided by computing environment 104 to client terminals 108 and/or server(s) 118, for example, as software as a service (SaaS), a software interface (e.g., application programming interface (API), software development kit (SDK)), an application for local download to the client terminal(s) 108 and/or server(s) 118, an add-on to a web browser running on client terminal(s) 108 and/or server(s) 118, and/or providing functions using a remote access session to the client terminals 108 and/or server(s) 118, such as through a web browser executed by client terminal 108 and/or server(s) 118 accessing a web sited hosted by computing environment 104. For example, a user uses client terminal 108 to attempt to access process 152 hosted by server 118, such as to post feedback on an online forum. Server 118 may access computing environment 104 for validation that the user is human. Computing environment 104 may generate one or more images by feeding a directive into a GenAI model. The generated images and instructions for the user to follow may be presented within GUI 150 on a display of client terminal 108. Upon successfully following the instructions, user may be validated as being a human, and granted access to process 152.

Computing environment 104 may be implemented as a standalone device (e.g., kiosk, client terminal, smartphone) that include locally stored code instructions 106A that implement one or more of the acts described with reference to FIG. 2, for locally validating that the user is a human. For example, for preventing access by malware running on the standalone device. The locally stored code instructions 106A may be obtained from a server, for example, by downloading the code over the network, and/or loading the code from a portable storage device, such as by installing an app on a smartphone of a user. The images may be generated locally by feeding the directive into the GenAI model 122A. In an example, a user may wish to secure their camera application on their smartphone to prevent malware from access it. An attempt to open the camera may trigger the validation process. The GUI 150 may be presented on the display of the smartphone.

Processor(s) 102 of computing environment 104 may be hardware processors, which may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIG. 2 when executed by hardware processor(s) 102.

Computing environment 104 may include a data storage device 122 for storing data, for example, GenAI model(s)

122A used to generate images as described herein, directive repository 122B designed to store directives, optionally text, which may be fed into the GenAI model 122A for creating the images, and/or a generated images repository 122C designed to store the generated images, as described herein. Data storage device 122 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, the internet, a local area network, a virtual network, a wireless network, a cellular network, a local bus, a point to point link (e.g., wired), and/or combinations of the aforementioned.

Computing environment 104 may include a network interface 124 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing environment 104 and/or client terminal(s) 108 include and/or are in communication with one or more user interfaces 126 which may present GUI 150, which may present the generated images and instructions to follow as part of the process for validating that the user is human. Exemplary user interfaces 126 include, for example, one or more of, a touchscreen, a display, gesture activation devices, a keyboard, a mouse, and voice activated software using speakers and microphone.

Referring now back to FIG. 2, features of the method described with reference to FIG. 2 may be triggered for validating that a user is human, for example, in response to the user using the client terminal to access a certain online service and/or platform. The validation may be performed to prevent automated systems, such as bots and/or crawlers, from accessing and/or interacting with the certain online service and/or platform.

At 202, instructions for feeding into the GenAI model may be accessed and/or created. The instructions are designed to be fed into a GenAI model for creation of images for validating that a user is human, as described herein.

The instructions may be related to one or more target objects which are to be depicted in the generated image. The user may then be instructed to perform a task according to the target objects which is used for validation that the user is human, for example, as described herein.

The instructions may be implemented as, for example, a text directive and/or description of a feature of the image for the GenAI model to generate. The text directive may be in a human readable format, such as represented using natural language. Other representations and/or formats designed to instruct the GenAI model may be implemented, for example, settings values of predefined parameters, instructions in a non-human readable format, and the like.

The terms description and/or text directive, as used herein, represent exemplary and not necessarily limiting implementations of the instructions for feeding into the GenAI.

Optionally, the instructions include a random seed, optionally a different value of the random seed for each image generated by the GenAI. Alternatively, the instructions may be randomly generated, optionally for each image created by the GenAI. The instructions may be randomly generated and/or the random seed may be used for each validation attempt, such as by each user, and/or for different validation attempts by the same user. The randomness may help ensure that a new unique image is created each time, without repetition. The creation of new unique images for each validation attempt may help prevent training of another machine learning model for learning how to automatically overcome the validation process. Since it is difficult to arrange a suitable training dataset using the randomly generated images, training of such model is made technically difficult.

The instructions may indicate a scenario for depicting in the image (e.g., of an object(s)) that is physically impossible in real life. For example, the target object defying gravity by floating in air, a purple cow with wings, a porcelain cow eating grass, architectures that are structurally impossible to maintain in reality, and the like. The generated images that are physically impossible in real life may help prevent training of another machine learning model for learning how to automatically overcome the validation process. Since such images cannot be captured by a camera, is it difficult to generate a suitable training dataset for training of such model.

The instructions may include a description of a representation of the target object that is different than the target object itself. Alternatively or additionally, the instructions may be for creation of an image where a texture of the target object is different than a real life texture of the target object. The instructions may be for generating the image of something that a human would understand that is the target object, but that is different enough from the target object itself since the target object is not represents in that way in real life. For example, an embroidery texture of the target object, a comic illustration of the target object, a non-realistic painted version of the target object, and a representation of the target object on a surface of another object such as a clock shape cut-out from a bar of soap.

The instructions may be for generating an image where there are multiple other objects that are different than the target object. The other objects may be similar enough to the target object to make it difficult for a machine learning model to differentiate between the other objects and the target object, but that a human is able to fairly simply differentiate between them. For example, the target object is a clock, and the other objects are other round objects, for example, bicycle wheels, balls, car tires, and the like.

An example of a text directive is now provided: a [cluttered/clean/old mahogany/marble] desk with a [small watch/gold medal/round chest image frame] on top of a [red/blue/white][notebook/mirror/handkerchief] style [Embroidery Texture/comics/Van Gogh/Comic Magazine], which may be used to generate thousands of combinations, never or rarely repeating.

Alternatively or additionally, actual images of objects (e.g., from the web, from a storage device) may be used as a style reference to generate even more variety, even if the text directive does not exist. For example, the drawings of some artist with a unique style can be given as an 'input style' into some types of GenAI image generation models.

Alternatively or additionally, different frames depicting the object may be extracted from a video generated by a suitable GenAI model designed for generation of videos.

At 204, the instructions are fed into the GenAI. One or more images are generated by the GenAI in response to the input of the instructions.

The generated image(s) may depict different variations of one or more common target objects. Alternatively or additionally, the generated image(s) may depict different objects, which may include the target object(s) and/or other objects. The objects (i.e., the target object(s) and/or other objects) depicted in the generated images may be, for example, at one or more of:

Unique and/or different angles, such as from different viewing poses. Views that cannot be physically captured in real time may be generated.

Unique and/or different sizes, such as very small, small, medium, large, and very large, including sizes that are not common and/or do not physically exist in real time. For example, a very large mouse next to a small elephant.

Unique and/or different shapes, such as non-standard contours and/or non-standard shapes. Shapes that do not physically exist in real life may be generated. For example, a dog having a square head.

Unique and/or different additional structural elements, for example, a two headed cat, or a tree growing light bulbs instead of fruits.

A unique color, such as an object which does not exist with the unique color in real life.

A target object depicted as made from another object. The target object and the other object may be similar, for example, a bicycle wheel with hands for functioning as a clock. The target object and the other object may be different, for example, a clock shown as etched out from a bar of soap.

A target object located on and/or within another object. The other object may be of a different type as the target object, which may be similar to the target object. For example, an image depicting a picture of a car on a t-shirt worn by a driver sitting in a "real car". The target object may be "t-shirt". In another example, the target object may be "automotive vehicle" where the intention is for the user to pick the real car rather than the picture of the car on the t-shirt.

At 206, the generated image(s) are presented. The generated images may be presented on a display of a client terminal, where the user using the client terminal is being validated as being human.

The generated image(s) are optionally presented within a user interface, optionally within a GUI designed for interaction by the user.

At 208, instructions for a user to perform an interactive task with the image(s) are presented. The instructions may be presented on the display of the client terminal, optionally within the user interface, optionally within the GUI.

Examples of instructions for the user to perform include: matching images depicting the target object in different variation, selecting the target object from an image with many other types of objects, selecting one or more images depicting the target object from multiple images, typing out an object in common in multiple images, identifying a non-realistic object, identifying a personal parameter of the user in one or more images, identifying a current state of a dynamic process in a generated image, and identifying a description of an animation in a generated video. Other examples are described herein.

In a more specific example, the user is to 'guess/find' the 'common/shared' object between the different images, where the images may include many other detail. The actual appearance/instance of the object may be different in each image. For example, there are three images of cows, one is a purple cow with wings, another is a cow in a pasture, and a third is a porcelain cow. The user is to 'type'/say the name of the object.

The interactive task may be performed, for example, by the user touching the image(s) or portion thereof presented on a touch screen, using a mouse cursor for selection, moving image(s) or portions thereof, marking images or portions thereof, typing text, and/or speaking audio into a microphone, and the like.

The text directive and/or description fed into the GenAI model to obtain the generated images may be non-presented on the display and/or may be non-accessible to the user. The text directive and/or description fed into the GenAI may remain hidden. The text directive and/or description may be deleted (or otherwise destroyed) after being fed into the GenAI. Preventing access to the text directive and/or description fed into the GenAI model to obtain the generated images may make it difficult for another automated process (e.g., machine learning model) to "read" the text directive and/or description in an attempt to automatically crack the validation process. Using the images alone, without the text directive and/or description, the automated process may be unable, or be technically challenged, in correctly performing the task, which may make the validation process secure against malicious attack.

At 210, interactions of the user are received. The interaction of the user in response to the interactive task may be monitored. For example, the interaction of the user with the image(s) and/or with the GUI may be monitored, such as which objects depicted in the image(s) the user clicks on, and/or which images presented in the GUI the user touches on a touch screen. In another example, text entered by the user using a keyboard and/or verbal audio spoken by the user into a microphone in response to the instructions, is obtained.

At 212, interactions of the user performing the interactive task are analyzed.

The interactions of the user with the image(s) and/or with the GUI may be analyzed with respect to the text directive. The interaction may be corrected with the text directive, such as to determine whether the interaction is correlated with the text directive or not. For example, with respect to the target object indicated in the text directive, such as to determine whether the user correctly interacted based on the target object.

The different image(s) generated by the GenAI model may be labeled with their respective text descriptors used to create them, which may be used for validation that the user is human by determining whether the user selection is correct or not according to the text descriptors serving as a ground truth indicating correctness. For example, to determine whether the user correctly selected images depicting the target object, and did not select images that do not depict the target object.

Alternatively or additionally, the interactions of the user with the image(s) and/or with the GUI may be analyzed by segmenting the object which the user selected (e.g., touched on a touch screen, and/or clicked on with a mouse cursor). A segmented patch may be generated that includes the segmented object. The segmented objects may be fed into a detector model trained to identify segmented objects. The text directive may be fed into the detector model as a hint and/or guidance for the detector model, to help identify the object in the segmented patch. For example, a clock drawn as embroidery which is usually difficult for a detector model to correctly identify, may be fed with the text directive "clock". The detector model may be asked "Is this a clock?" In another example, different segmented objects may be compared to each other by a correlation process that computes a correlation value between two segmented patches to determine whether the same object is depicted or not. In another example, a text description typed by the user is correlated with the text directive fed into the GenAI model. For example, the user is instructed to provide what a common object (common element and/or common feature) seen in multiple images is, for example, type the common element and/or say what the common element is into a microphone). The description the user provided is correlated with the text directive that includes the description of the target object fed into the GenAI model.

At 214, in response to determining that the interactions of the user performing the interactive task correlate with the text directive, the user may be validated as being human. The user may be granted access to the service and/or platform in response to the validation.

At 216, one or more features described with reference to 202-214 may be iterated.

The iterations may be performed in response to a lack of validation that the user is human, such as lack of correlation between the interaction of the user and the text direction. The iterations may be to give the user another chance, such as when the user did not understand the instructions, and/or made an error.

Alternatively or additionally, the iterations may be performed for each user, such as each user attempting to access the service and/or platform.

Optionally, during each iteration, a new image is dynamically generated by the GenAI model, and/or the user may be instructed to perform a different interaction task. Dynamically changing the generated images and/or the interaction tasks may provide further security against automated processes attempting to overcome the validation process.

Optionally, one or more features described with reference to FIG. 2 are adapted based on a prediction that GenAI models may sometimes generate erroneous images. The image generated by the GenAI may not be based on the text description fed into the GenAI model, for example, the generated image excludes the target object described in the text directive fed into the GenAI model. Since the images generated by the GenAI model are designed to be difficult to process by automated image detector processes, these automated image detector processes cannot be reliably employed to validate that the image generated by the GenAI model correctly match the text directive fed into the GenAI model. A statistical approach may be designed that takes into account the occasional erroneous images generated by the GenAI model.

An example statistical approach may be iterating the features as described with reference to 202-212, the number of iterations may be selected based on a statistical prediction of likelihood of the GenAI model incorrectly generating an image. The validation as described with reference to 214 may be based on the number of iterations and the prediction of likelihood of the GenAI model incorrectly generating an image. For example, generating three iterations, and validating that the user is human when the user correctly performs two of the three iterations, based on the statistical prediction that the GenAI model may have incorrectly generated image(s) for one of the iterations.

Another example of a statistical approach in which a single iteration is performed (e.g., to avoid multiple iterations) may be based on creating multiple images, based on a statistical prediction of likelihood of the GenAI model incorrectly generating an image. One or more images may be intentionally created as "erroneous", by being created using a text directive that is different than the text directive used to create the "desired" images. For example, the text directive includes instructions for creating images depicting a target object, and another image that intentionally excludes the target object. The validation as described with reference to 214 may be based on the user correctly selecting a number of images that is less than the total number of created images, to compensate for the likelihood of error by the GenAI model. For example, 8 images are created by the GenAI model and presented. The GenAI model may be instructed to correctly generate 7 of the 8 images, and to intentionally create an "erroneous" eight image. The user is validated when correctly selecting 6 of the 8 images, taking into account that the GenAI model may have incorrectly generated one of the images.

Some exemplary embodiments based on FIG. 2 are now described. The embodiments may relate to different examples of text directives (or other instructions), and/or different interactive tasks for the user to perform. For clarity and simplicity of explanation, some features of FIG. 2 are omitted with respect to the other embodiments, but it is to be understood that one skilled in the art understands how to implement the method of FIG. 2 with respect to the other embodiments.

In an example, at 202, the text directive represents a description of a target object.

At 204, the text directive is fed into the GenAI model to generate one or more images depicting multiple of instances of the target object and multiple other types of objects different than the first object. Each instance of the target object represents a unique variation of the target object, for example, a unique angle, a unique size, a unique shape, a unique additional structural element, depicted as being made from a unique material, a unique texture, a unique color, and depicted as made from yet another object that is visually similar to a type of the target object.

At 208, the instructions are for the user to identify common instances of objects having unique variations that are depicted in the image(s). For example, the identification may be done by the user clicking on objects using a mouse cursor, and/or touching the objects on a touch screen. Such identification of objects with different unique variations and/or in an image with other types of objects is technically challenging for an automated process (e.g., trained model) to perform but is expected to be fairly easy for a human.

At 212, the objects selected by the user are compared to the text description of the target object and/or to each other. The user is validated as human when the user is determined to have correctly identified the target object(s) in the generated image(s).

In another example where the text directive represents a description of the target object, the GenAI model may be instructed to generate multiple images each including a respective instance of the target object (i.e., first set) and multiple other images each excluding the target object (i.e., second set). The presented instructions are to identify a set of image from the first set and the second set that have a common object. The user is validated when the images the user selects match the first set of images without including any of the second set of images. Alternatively, the presented instructions are to identify a set of images from the first set of images and the second set of images that do not have an object in common. The user is validated when the images the user selects match the second set of images without including any of the first set of images.

The identification of which images are of the first set and which are of the second set may be based on the text directive fed into the GenAI model. Images generated based on the text directive that includes the description of the target object are identified as belonging to the first set. Images generated based on the text directive that excludes the description of the target object are identified as belonging to the second set.

In another example where the text directive represents a description of the target object, a first image(s) is generated by feeding the text directive into the GenAI model in combination with a first random seed. A second image(s) is generated by the GenAI model by feeding the text directive into the GenAI in combination with a second random seed. Multiple third images depicting multiple other objects different than the target object are generated using the GenAI model. The first image(s), the second image(s), and the third images are presented. The instructions presented to the user are for matching images with a common element. The user is validated as human when the first image(s) and the second image(s) are selected by the user.

Other exemplary embodiments are now described. The embodiments may be based on image of non-realistic objects. At 202, the text directive includes a description of a target object that is not a realistic representation of the target object. At 204, the text directive including a description of a target object is fed into the GenAI model to generate an image(s) with a representation of the target object that is different than the target object itself. For example, an embroidery texture of the target object, a comic illustration of the target object, a non-realistic painted version of the target object, a representation of the target object on a surface of a different object, and a texture of the target object that is different than a real life texture of the target object. At 208, the instructions presented to the user are to indicate the target object, for example, click on the target object within the image, and/or type out a description of the target object. The text directive indicating the target object may be not presented and/or not accessible to the user. At 212 and 214, the user is validated as being human when the user indication matches the description of the target object fed into the GenAI model.

Yet other exemplary embodiments are now described. The embodiments may be based on personalized images. At 202, a text directive including at least one personal parameter of a user, in accessed. The personal parameter(s) may be obtained, for example, manually entered by the user, and/or automatically extracted, by code. The code may extract data from websites that are associated with the user (e.g., personal profile on a social network platform, personal blogs) and/or pages that mention the user (e.g., news reports, pictures of the user posted on a community bulletin board). Examples of personal parameters of the user include a webpage the user recently looked at, a hobby of the user, a picture of a person related to the user (e.g., wife, friend, child), and an object the user possesses (e.g., car, dog, gardening tools, hat). At 204, the text directive including the personal parameter(s) is fed into the GenAI model to generate an image visually depicting the personal parameter(s). For example, a picture of baseball game when the hobby of the user is baseball, or an image including the dog of the user. At 208, the instructions may be for the user to indicate the image depicting the personal parameter(s) and/or to indicate the personal parameter(s) depicted in the image. At 212 and 214, the user is validated as human when the user indication matches the personal parameter(s) of the text directive fed into the GenAI model.

Yet other exemplary embodiments are now described. The embodiments may be based on dynamic processes. At 202, a text directive including at least one current state of a dynamic process, is accessed. The current state of the dynamic process may be accessible by the user. The current state may be obtained, for example, manually entered by a user, automatically extracted by code, and/or received as a message sent by another device and/or another process. For example, the current state may be obtained by code extracting the current state from a server, and/or reading a value of a predefined field which is automatically updated by the server. Examples of current states of dynamic processes include: current weather where the user is living, subject currently in the news, current value of a stock market index, and current website open in another window on a client terminal of the user. At 204, a text directive including the current state is fed into the GenAI model to generate an image visually depicting the current state. For example, depicting the current weather, and/or an image in which the current value of the stock market index is presented, or a picture depicting an election when an election is about to take place. At 208, the instructions may be for the user to indicate the image depicting the current state, and/or the current state depicted in the image. At 212 and 214, the user is validated as human when the user indication matches the current state of the text directive fed into the GenAI model.

Yet other exemplary embodiments are now described. The embodiments may be based on using an animation to validate that the user is human. At 202, a description of an animation is accessed. The description may be obtained, for example, manually entered by a user, randomly generated, and/or automatically accessed by code. The description may be represented, for example, as text and/or other format suitable for including in a text directive fed into the GenAI model. Examples of the description of the animation include an emotion, an action, a dance, and an expression. At 204, a text directive including the description of the animation is fed into the GenAI model to generate a video depicting the animation of the description over multiple frames. For example, a movie showing a person driving a car and getting upset at another car for cutting them off, or a bear performing a famous dance maneuver, or two birds hugging each other in celebration of a certain baseball team winning a game. At 208, the instructions may be for the user to indicate the video depicting the animation, and/or the animation depicted in the video, for example, "Describe what you see in the video". At 212 and 214, the user is validated as human when the user indication matches the description of the animation of the text directive fed into the GenAI model.

Referring now back to FIG. 3, images 302A-H may be presented for validating that a user is a human. Images 302A-H may be created by feeding a text directing into the GenAI model. The text directive fed into the GenAI model for generating the images is not indicated and/or otherwise presented. Images 302A-D depict a watch on top of a red notebook. Images 302E-H depict a gold metal placed on a red handkerchief. It is easy for a human to differentiate between a watch on top of a red notebook, and a gold metal placed on a red handkerchief, while the same task may be difficult for an automated process to solve, in particular when no indication of what is in the images, or what to search for is not known. The instructions to the user may be generated accordingly. For example, identify images with a common object. In another example, four images with watches on a red notebook are shown and a fifth image of a gold metal on a red handkerchief, and the instructions are for identifying the object that does not belong in the group. In yet another example, images 302A, 302B, and 302E, 302F are shown on the left side of the screen, and the other images 302C, 302D, and 302G, 302H are shown on the right side of the screen, and the instructions are for grouping the images into two groups having common objects. In yet another example, images 302A and/or 302B are shown on the left side, images 302E and/or 302F are on the right side, and the instructions are for the user to click on an object in 302E and/or 302F that is shown in 302A and/or 302B. In yet another example, images 302C and/or 302D are shown on the left side, images 302G and/or 302H are on the right side, and the instructions are for the user to click on an object in 302G and/or 302H that is shown in 302C and/or 302D.

Referring now back to FIG. 4, images 402A-G may be presented for validating that a user is a human. Images 402A-G may be created by feeding a text directive into the GenAI model. The text directive fed into the GenAI model for generating the images is not indicated and/or otherwise presented. Images 402A-G all depict a watch, but shown with different texture and/or with different backgrounds. The instructions may be for a user to identify the common object, for example, type it out, and/or speak into a microphone. The user is validated when the common object the user provides matches the common object of the text directive fed into the GenAI model. It is noted that this task is fairly easy for a user, but may be technically challenging for an automated process, for example, due to the differences in texture and/or background, and/or due to most images showing the watch on a notebook.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant GenAI models will be developed and the scope of the term GenAI model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of validation of a human user, comprising:

feeding a description of a first object into a GenAI model to generate at least one image depicting a plurality of instances of the first object and a plurality of second objects different than the first object, each instance representing a unique variation of the first object;

via a user interface presented on a display of a client terminal:

presenting the at least one image;

presenting instructions for a user to identify common instances of objects having unique variations that are depicted in the at least one image;

receiving the user indication; and validating that the user is a human when the common instances of objects identified by the user matches the description of the first object fed into the GenAI model;

wherein the at least one image comprises a plurality of images, and a number of the plurality of images and the instructions for the user for validating that the user is human, are selected according to a statistical prediction of the GenAI model erroneously generating an image of the number of the plurality of images that does not match the description of the first object, wherein the validating that the user is human is performed when a target less than the number of images is selected by the user for compensating for the statistical prediction of the GenAI model erroneously generating the image.

2. The computer implemented method of claim 1, wherein the description of the first object fed into the GenAI model is non-presented on the display and/or is non-accessible to the user.

3. The computer implemented method of claim 1, wherein the GenAI model generates a plurality of first images each including a respective instance of the first object and a plurality of second images each excluding the first object, and the presented instructions are to identify a set of images from the plurality of first images and the plurality of second images that have a common object.

4. The computer implemented method of claim 1, wherein the GenAI model generates a plurality of first images each including a respective instance of the first object and a plurality of second images each excluding the first object, and the presented instructions are to identify a set of images from the plurality of first images and the plurality of second images that do not have an object in common.

5. The computer implemented method of claim 1, wherein the unique variations are selected from: a unique angle, a unique size, a unique shape, a unique additional structural element, depicted as being made from a unique material, a certain type of the first object located on and/or within another type of the first object, a unique texture, a unique color, and depicted as made from a third object that is visually similar to a type of the first object.

6. The computer implemented method of claim 1, wherein the description including the first object is randomly generated for creating a unique image.

7. The computer implemented method of claim 1, wherein the description indicates a scenario including the first object that is physically impossible in real life.

8. The computer implemented method of claim 1, wherein the description is of a representation of the first object that is different than the first object itself.

9. The computer implemented method of claim 8, wherein the description is selected from a group comprising: an embroidery texture of the first object, a comic illustration of the first object, a non-realistic painted version of the first object, and a representation of the first object on a surface of a third object.

10. The computer implemented method of claim 1, wherein the description is of a texture of the first object that is different than a real life texture of the first object.

11. The computer implemented method of claim 1, wherein the at least one image further depicts a plurality of second objects different than the first object.

12. The computer implemented method of claim 1, wherein the at least one image comprises a first image generated using a first random seed, and further comprising:

generating a second image by feeding the description into the GenAI using a second random seed, and generating a plurality of third images depicting a plurality of second objects different than the first object using the GenAI model;

wherein presenting the image comprises presenting the first image, the second image, and the plurality of third images, wherein the presented instructions are for matching images with a common element, wherein validating comprises validating when the first image and the second image are indicated by the user.

13. The computer implemented method of claim 1, further comprising iterating the feeding, the presenting the at least one image, the presenting instructions, and the receiving instructions, for validating that the user is human when a number of iterations in which the common instances of objects identified by the user correctly matches the description, is selected according to a statistical prediction of the GenAI model erroneously generating the at least one image when the at least one image does not match the description of the first object.

14. The computer implemented method of claim 1, wherein at least one of the number of the plurality of images is intentionally created using a different description of the first object.

15. A computer implemented method of validation of a human user, comprising:

feeding a description of an object into a generative artificial intelligence (GenAI) model to generate at least one image with a representation of the object that is different than the object itself;

via a user interface presented on a display of a client terminal:

presenting the at least one image;

presenting instructions for a user to indicate the object, wherein the description of the object fed into the GenAI model is non-presented on the display and/or is non-accessible to the user;

receiving the user indication; and validating that the user is a human when the user indication matches the description fed into the GenAI model;

wherein the at least one image comprises a plurality of images, and a number of the plurality of images and the instructions for the user for validating that the user is human, are selected according to a statistical prediction of the GenAI model erroneously generating an image of the number of the plurality of images that does not match the description of the first object, wherein the validating that the user is human is performed when a target less than the number of images is selected by the user for compensating for the statistical prediction of the GenAI model erroneously generating the image.

16. The computer implemented method of claim 15, wherein the description is selected from a group comprising: an embroidery texture of the object, a comic illustration of the object, a non-realistic painted version of the object, and a representation of the object on a surface of a second object.

17. The computer implemented method of claim 15, wherein the description is of a texture of the object that is different than a real life texture of the object.

18. A computer implemented method of validation of a human user, comprising:

accessing at least one personal parameter of a user;

feeding a text directive including the at least one personal parameter into a generative artificial intelligence (Ge-nAI) model to generate at least one image visually depicting the at least one personal parameter;

via a user interface presented on a display of a client terminal:

presenting the at least one image;

presenting instructions for a user to indicate at least one of: the at least one image depicting the at least one personal parameter, and the at least one personal parameter depicted in the at least one image;

receiving the user indication; and validating that the user is a human when the user indication matches the at least one personal parameter of the text directive fed into the GenAI model;

wherein the at least one image comprises a plurality of images, and a number of the plurality of images and the instructions for the user for validating that the user is human, are selected according to a statistical prediction of the GenAI model erroneously generating an image of the number of the plurality of images that does not match the description of the first object, wherein the validating that the user is human is performed when a target less than the number of images is selected by the user for compensating for the statistical prediction of the GenAI model erroneously generating the image.

19. The computer implemented method of claim 18, wherein the at least one personal parameter of the user is selected from: a webpage the user recently looked at, a hobby of the user, a picture of a person related to the user, and an object the user possesses.

20. A computer implemented method of validation of a human user, comprising:

accessing at least one current state of a dynamic process accessible by a user;

feeding a text directive including the at least one current state into a generative artificial intelligence (GenAI) model to generate at least one image visually depicting the at least one current state;

via a user interface presented on a display of a client terminal:

presenting the at least one image;

presenting instructions for a user to indicate at least one of: the at least one image depicting the at least current state, and the at least one current state depicted in the at least one image;

receiving the user indication; and validating that the user is a human when the user indication matches the at least one current state of the text directive fed into the GenAI model;

wherein the at least one image comprises a plurality of images, and a number of the plurality of images and the instructions for the user for validating that the user is human, are selected according to a statistical prediction of the GenAI model erroneously generating an image of the number of the plurality of images that does not match the description of the first object, wherein the validating that the user is human is performed when a target less than the number of images is selected by the user for compensating for the statistical prediction of the GenAI model erroneously generating the image.

21. The computer implemented method of claim 20, wherein the at least one current state is selected from: current weather where the user is living, subject currently in the news, current value of a stock market index, current website open in another window on a client terminal of the user.

22. A computer implemented method of validation of a human user, comprising:

feeding a text directive into a generative artificial intelligence (GenAI) for generating at least one image depicting a plurality of different objects and/or different variations of at least one common object;

via a user interface presented on a display of a client terminal:

presenting the at least one image;

presenting instructions for a user to perform an interactive task with the at least one image, wherein the text directive fed into the GenAI model is non-presented on the display and/or is non-accessible to the user;

analyzing interaction of the user performing the interactive task with respect to the text directive; and validating that the user is a human when the interactions of the user performing the interactive task correlate with the text directive;

wherein the at least one image comprises a plurality of images, and a number of the plurality of images and the instructions for the user for validating that the user is human, are selected according to a statistical prediction of the GenAI model erroneously generating an image of the number of the plurality of images that does not match the description of the first object, wherein the validating that the user is human is performed when a target less than the number of images is selected by the user for compensating for the statistical prediction of the GenAI model erroneously generating the image.

* * * * *